United States Patent [19]

Fetterman et al.

[11] Patent Number: 5,153,733
[45] Date of Patent: Oct. 6, 1992

[54] FILM SCANNER

[75] Inventors: Clyde L. Fetterman, Webster; Fiscella Marcello D., Fairport, both of N.Y.

[73] Assignee: Eastman Kodak Company, Rochester, N.Y.

[21] Appl. No.: 559,481

[22] Filed: Jul. 27, 1990

[51] Int. Cl.$^5$ ............................................. H04N 5/235
[52] U.S. Cl. ...................................... 358/214; 358/54; 358/209; 352/105
[58] Field of Search ................ 358/214, 54, 498, 474, 358/209; 355/38, 47, 48, 49, 50; 352/105, 96; 226/171

[56] References Cited

U.S. PATENT DOCUMENTS

| | | | |
|---|---|---|---|
| 2,314,027 | 3/1943 | Young | 178/11 |
| 2,939,362 | 6/1960 | Cole | 352/105 |
| 3,109,924 | 11/1963 | Frederick | 235/61.11 |
| 4,105,199 | 8/1978 | Sato et al. | 271/122 |
| 4,105,316 | 8/1978 | Söding et al. | 353/109 |
| 4,122,504 | 10/1978 | Prozzo et al. | 360/90 |
| 4,281,351 | 7/1981 | Poetsch et al. | 358/214 |
| 4,292,621 | 9/1981 | Fuller | 340/146.3 H |
| 4,300,169 | 11/1981 | Sato | 358/256 |
| 4,310,856 | 1/1982 | Poetsch | 358/214 |
| 4,320,963 | 3/1982 | Satomi | 355/50 |
| 4,394,089 | 7/1983 | McIntosh et al. | 358/88 |
| 4,429,333 | 1/1984 | Davis et al. | 358/293 |
| 4,868,383 | 9/1989 | Kurtz et al. | 250/228 |

FOREIGN PATENT DOCUMENTS 1282481 7/1972 United Kingdom.
2089060 6/1982 United Kingdom.

*Primary Examiner*—Michael Razavi
*Assistant Examiner*—Tuan V. Ho
*Attorney, Agent, or Firm*—David M. Woods

[57] ABSTRACT

A film scanner is disclosed which comprises a dynamic film gate. The film gate includes a pair of capstans for supporting the film at an imaging station and a pair of belts which clamp the film against the capstans. The capstans are driven to advance the film through the imaging station. An integrating cylinder, located between the capstans, produces a line of light on the film, and light transmitted through the film in imaged onto a linear CCD image sensor,

17 Claims, 2 Drawing Sheets

(5,153,733)

FILM SCANNER

REFERENCE TO RELATED APPLICATION

Reference is made to the following U.S. applications filed on even date herewith: Ser. No. 07/559,249, entitled "Film Scanner", filed in the name of Wakefield, Ser. No. 07/559,247, entitled "Film Scanner", filed in the name of Erck et al., and Ser. No. 07/559,741, entitled "Linear Light Source", filed in the name of Federico et al. These applications are assigned to the assignee of the present invention.

1. Field of the Invention

This invention relates to a film scanner, and more particularly, to such a scanner having a dynamic film gate.

2. Background of the Invention

In various types of imaging apparatus, a photographic film must be clamped in a workstation while a particular operation is performed on the film. In certain types of apparatus, for example, film scanners, the film must be held extremely flat in order for an image on the film to be recorded properly. One problem in maintaining the film flat is that photographic film has a natural curl due to an emulsion coated on one side of the film. In one known type of film gate, a film is clamped against a flat platen, and the film and platen are moved relative to an image sensor to scan the film. In the use of such a film gate, the film must be clamped and unclamped for each film frame, and the film platen must be moved to a home position after each frame is scanned. Such a technique requires a significant number of moving parts, and it is relatively slow. Further, devices of this type are likely to scratch the film, and the motion of the platen introduces the possibility of vibrations into the system.

It is also known to use a rotary film gate, as disclosed, for example, in U.S. Pat. No. 4,281,351. U.S. Pat. No. 4,281,351 discloses apparatus for the line-by-line optical scanning of a film. In order to reduce friction of the film adjacent the scanning region, rollers or endless belts support the film at positions on the film outside of the film frames. A disadvantage of the apparatus disclosed in this patent is that the only means for maintaining the film flat in the scan region is through the tension in the film. Thus, any irregular motion in the drive system is transmitted to the film, and this tends to produce blurring in the scanned image. Further, the arrangement disclosed in the patent is not bidirectional nor is it suitable for use with film strips which are too short to be mounted on the feed rollers.

SUMMARY OF THE INVENTION

It is an object of the present invention to overcome the problems in the prior art discussed above and to provide an improved film scanner.

In accordance with the present invention, there is provided a film scanner comprising: means for supporting a film at an imaging station, the supporting means being movable with the film; means for urging the film against the supporting means, the urging means contacting the film along an edge thereof and being movable therewith; illumination means for producing a line of light across the film while it is contacted by the supporting means and the urging means; and means for driving the supporting means and the urging means to advance the film relative to the illumination means.

In one embodiment of the present invention, the film scanner comprises a pair of capstans which support the film as it passes through an imaging station. The film is pressed against the capstans by a pair of belts, and the capstans are driven to advance the film through the imaging station. An integrating cylinder provides a line of light on the film at the imaging station, and light transmitted through the film is imaged onto a CCD image sensor. The integrating cylinder is located between the capstans and is coaxial with the two capstans. The integrating cylinder includes a hollow baffle along its longitudinal axis, and a drive shaft attached to the capstans passes through the baffle.

An advantage of the present invention is that the film is advanced at a constant rate through the imaging station. The film can be driven at a selected scan speed and at a fast frame-to-frame advance, since the same motion serves to scan the film and advance the film to the next scan area. Belts provide for dynamic clamping of the film in the imaging station, and use of the belts eliminates the need for tensioning the film in the imaging station. Further, the belts are arranged to wrap the film around a portion of the rollers in a direction to remove the inherent curl of the film, and this makes the film very flat in the imaging station. As a result, imaging optics having a smaller depth of field can be used, and thus, the resolution of the scanner is increased. The illumination device is located between the capstans in order to provide a very compact and efficient device.

Other features and advantages will become apparent upon reference to the following Description of the Preferred Embodiment when read in light of the attached drawings.

DESCRIPTION OF THE PREFERRED EMBODIMENTS

Figure 1:
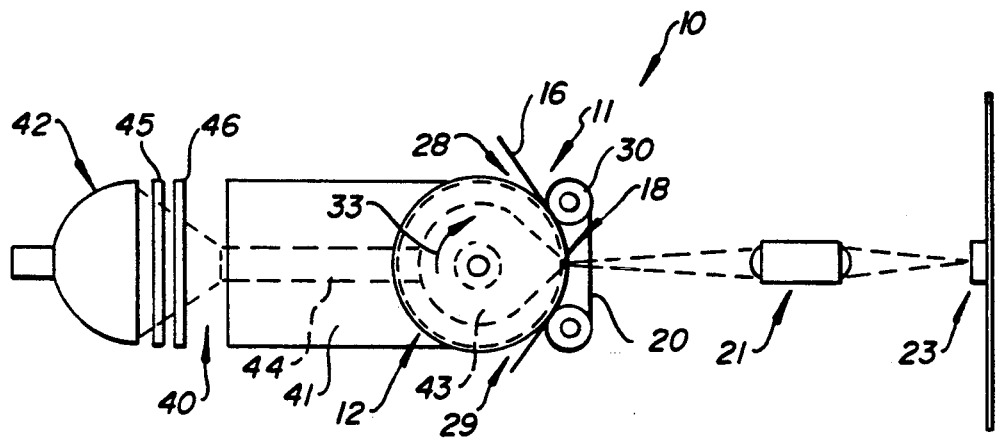
FIG. 1 is a front elevational view of the film scanner of the present invention.

With reference to FIG. 1, there is shown a film scanner 10 which is constructed in accordance with the present invention. Film scanner 10 comprises a dynamic film gate 11 which is adapted to support a film 16 as it is moved through an imaging station indicated at 18, an illumination source 40 which is adapted to provide a line source of light at station 18, an imaging lens 21, and a linear CCD image sensor 23.

Figure 2:
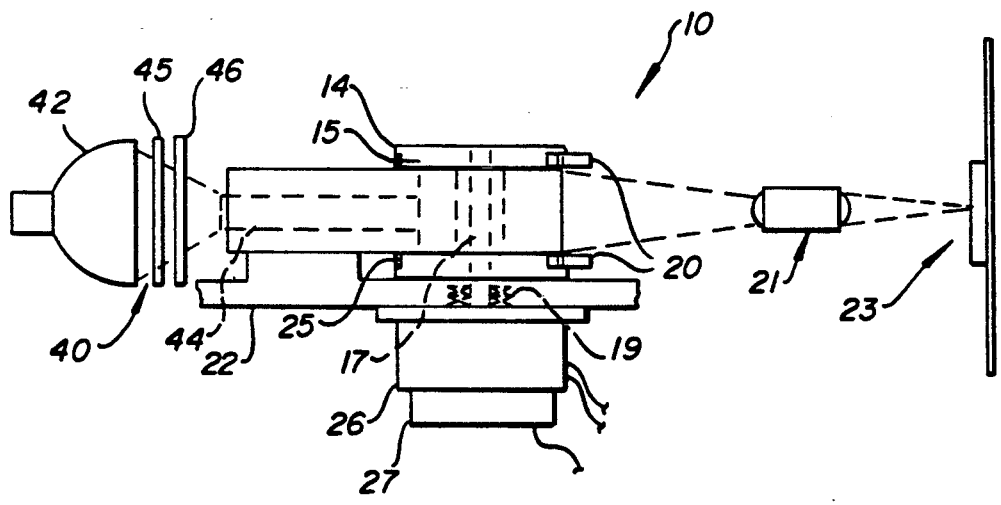
FIG. 2 is a top plan view of the film scanner shown in FIG. 1.

Film gate 11 comprises a pair of capstans 12 and a pair of belts 20 which are adapted to clamp the film 16 against capstans 12 as the film is advanced through station 18. As shown in FIG. 2, each of the capstans 12 includes an outer cylindrical portion 14 and an inner cylindrical portion 15 of a reduced diameter. The capstans 12 are spaced such that the film 16 rides on the portions 15.

Figure 4:
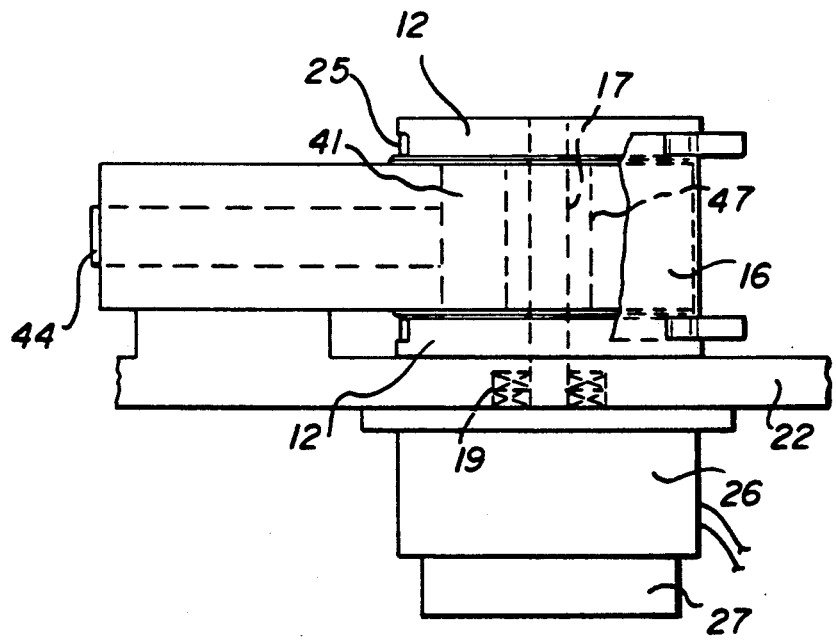
FIG. 4 is a top plan view of the elements shown in FIG. 3.

As shown in FIGS. 2 and 4, inner cylindrical portions 15 include a coating 25 of a material having a high coefficient of friction, such as urethane. The velocity of high resolution scanners, such as scanner 10, must be closely controlled in order to avoid perturbations which will cause artifacts in the output media. Since scanner 10 drives the film 16 by means of the pressure applied by belts 20 at the belt-film interface, slippage at this interface would cause a speed variation. Further, if the coating 25 is too thick and/or not of sufficient hardness, the coating could deflect under belt load which would cause a slight change in capstan radius. Such a change in radius would cause a velocity change in the nip area. Thus, it is important that a relatively thin coating 25 of a proper hardness be used on portions 15 of capstans 12. When the hardness of the coating 25 is increased, the coefficient of friction is decreased, and an increase of the load on the belts 20 is required. If the load on the belts 20 is too high, belt life and motor performance can be adversely affected. One suitable coating 25 for portions 15 is a dual durometer coating which is less than 0.020 inch thick.

Capstans 12 are driven by means of a drive shaft 17 which is supported in a bearing 19 in scanner support structure 22. Drive shaft 17 is connected to a drive motor 26 (FIG. 2). Motor 26 can be, for example, a bidirectional DC servo motor of a type well known in the art. Motor 26 is adapted to operate under an electronic servo control (not shown) which receives position signals from an encoder 27 attached to shaft 17.

Each of the belts 20 is trained around idler pulleys 30 which are mounted for rotation in a portion (not shown) of support structure 22. Pulleys 30 are positioned such that a belt 20 of the proper length will provide a wrap angle α (FIG. 3) on a capstan 12 of an amount sufficient to buckle the film and to give enough traction to drive the film. Each belt 20 will clamp the film 16 against a capstan 12 with enough force so that the film will be held in the desired position and will be moved by the capstan as the capstan is driven by motor 26.

Each belt 20 is relatively narrow so that it only contacts an edge of the film 16 and does not extend into the image area. The belts 20 can be constructed of a fiberglass core, or similar non-stretch material, which is coated on both sides with a urethane or similar high friction material. The belts 20 supply the dynamic clamping of the film to the capstans 12, and the coating on belts 20 is sufficiently elastic to ensure that any perturbations in the system will not be transferred to the image sensor. Alternatively, the belts 20 can be formed of a stretch material such as urethane.

When motor 26 is actuated, capstans 12 will be rotated at a selected angular velocity and direction, for example, in the direction of arrow 33 (FIG. 1). The encoder 27 mirrors the velocity of motor 26 and supplies signals to the servo controller (not shown). When no film is present in the scanner 10, the belts 20, which are in direct contact with the high coefficient of friction material 25 on capstans 12, track the arc imparted by the capstans 12 over the angle α. Nips 28 and 29 are formed between the belts 20 and the capstans 12 at the points where the belts 20 begin to withdraw from the capstans 12. When a film 16 is fed to, for example, nip 28, a pinching action on the film 16 will capture the film 16 and pull it into the interface between belts 20 and capstans 12. The film 16 will be advanced through the film gate 11 in the direction of arrow 33 at a constant speed which is controlled by the speed of motor 26.

Illumination source 40 is mounted between capstans 12 and is adapted to provide a line of illumination at the imaging station 18. Light transmitted through the film is imaged onto linear CCD sensor 23 by means of lens 21. The illumination source 40 includes an integrating cylinder 41 and a lamp 42 such as a 24 volt DC tungsten halogen lamp, type ELC, sold by General Electric Co. Light from lamp 42 is delivered into a cavity 43 in cylinder 41 by means of a light pipe 44 which permits lamp 42 and other optical elements to be displaced from the cavity 43. Light from lamp 42 is delivered to light pipe 44 through a hot mirror (IR reflector) 45 and an IR absorber 46. A suitable light pipe for introducing light into cavity 43 is a rod which is formed from fused quartz or a fused silica material and has a very high tranmission, for example, a fused quartz rod obtainable from Heraeus-Amersil, Inc.

Figure 3:
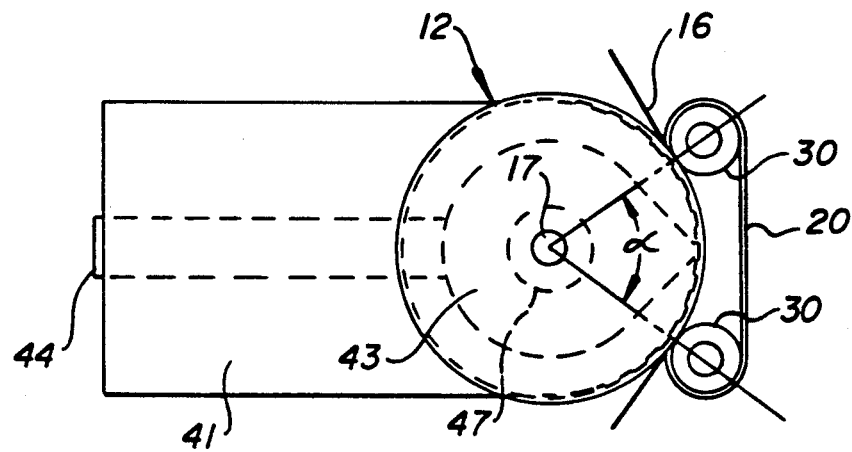
FIG. 3 is an enlarged front elevational view showing the integrating cylinder and the film gate.

The drive shaft 17 for the capstans 12 is preferably incorporated within the integrating cylinder 41 in order to provide a rigid direct drive to each of the capstans. As best shown in FIGS. 3 and 4, integrating cylinder 41 includes a hollow baffle 47 within the cavity 45 of cylinder 41, and drive shaft 17 passes through the baffle 47. Such an arrangement makes a very compact scanner, and the arrangement also makes it possible for the integrating cylinder to be located closely adjacent to the film 16. Since the integrating cylinder is located close to the film 16, the system is more efficient and a lamp of a lower wattage can be used.

The integrating cylinder 41 can be constructed generally as disclosed in U.S. Pat. No. 4,868,383, to Kurtz et al., granted Sep. 19, 1989. A preferred form of integrating cylinder for use in the present invention, however, is disclosed in the aforementioned U.S. patent application, entitled "Linear Light Source." The integrating cylinder disclosed in this patent application produces a line of diffuse illumination which has a uniform linear and angular distribution.

Image sensor 23 can be a linear CCD image sensor such as a No. KLI-5001A/B sensor, manufactured by Eastman Kodak Co., Rochester, N.Y. The image sensor can also include an array which consists of three separate photodiode linear arrays for capturing red, green, and blue signals. The image sensor 23 must be precisely located relative to scanning station 18, and to this end, it can be supported in a mount as disclosed in U.S. patent application, Ser. No. 381,897, filed Jul. 19, 1989. Signals from image sensor 23 can be processed in a well known manner in order to produce an electronic record of the images on film 16.

In the operation of film scanner 10, a film 16, for example, a 35 mm film, is threaded into the nip 28 in gate 11, and the film is advanced therein by means of the cooperative action of belts 20 and capstans 12. As the film 16 is advanced, the image is scanned in a page scan direction, and the line scan is performed by the clocking of the individual image elements in the sensor 23. When an end of film 16 reaches nip 29, the film 16 will move out of the gate 11, and the film can be recovered. Alternatively, motor 26 can be reversed just before the end reaches nip 29, and the film can be scanned in the opposite direction or returned to its starting position.

The invention has been described in detail with particular reference to the preferred embodiments thereof, but it will be understood that variations and modifications can be effected within the spirit and scope of the invention. For example, although scanner 10 has been described herein with reference to the scanning of film, it will be apparent that other webs of material, such as paper, could also be scanned to record information contained thereon.

We claim:
1. A film scanner comprising:
   means for supporting a film at an imaging station, said supporting means, being movable with the film;

means for urging said film against said supporting means with sufficient force so that said film will move with the supporting means, said urging means contacting said film along an edge thereof and being movable therewith;

illuminating means for producing a line of light across said film while it is contacted by said supporting means and said urging means; and means for driving said supporting means and wherein said urging means is driven by said supporting means to advance the film relative to said illumination means, wherein said driving means includes a rotatably driven element which drives said supporting means.

2. A film scanner, as defined in claim 1, wherein said supporting means includes capstan means.

3. A film scanner, as defined in claim 2, wherein said capstan means includes two capstans which are spaced to contact opposite edges of said film.

4. A film scanner, as defined in claim 1, wherein said urging means includes two belts which are spaced to contact opposite edges of said film.

5. A film scanner, as defined in claim 3, wherein said urging means includes a first belt which is operable to hold film onto one of said capstans.

6. A film scanner, as defined in claim 5, wherein said urging means includes a second belt which is operable to hold film onto the other of said capstans.

7. A film scanner, as defined in claim 1, wherein said driving means is bidirectional.

8. A film scanner, as defined in claim 1, wherein said illumination means is located adjacent said supporting means.

9. A film scanner, as defined in claim 8, wherein said illumination means includes an integrating cylinder.

10. A film scanner, as defined in claim 9, wherein said cylinder is located within said supporting means.

11. A film scanner comprising:

a pair of spaced-apart capstans for supporting a film at an imaging station;

belt means for urging the film against said capstans, said belt means including a first endless belt which urges one edge of said film against one of said capstans and a second endless belt which urges an opposite edge of said film against the other of said capstans;

illumination means for producing a line of light on said film at said imaging station, said line of light extending between said edges, and said light being transmitted through said film;

means for moving said capstans, wherein said belts are driven by said capstans to advance film held therebetween relative to said illumination means, wherein said moving means includes a rotatably driven element which drives said captans; and an image sensor for receiving light transmitted through said film.

12. A film scanner, as defined in claim 11, wherein means are provided for imaging said light onto said sensor.

13. A film scanner, as defined in claim 11, wherein each of said capstans includes a first portion of one diameter and a second portion of a diameter less than said one diameter, and said film is supported on said second portions.

14. A film scanner, as defined in claim 13, wherein each of said belts is adapted to extend around a predetermined circumferential portion of a capstan in order to clamp said film against the capstan in said circumferential portion.

15. A film scanner, as defined in claim 11, wherein each of said capstans is coated on an outer periphery thereof with a high coefficient-of-friction material.

16. A film scanner, as defined in claim 15, wherein the material is coated on said capstans to a thickness of less than about 0.020 inches.

17. A film scanner comprising:

a pair of spaced-apart capstans for supporting a film at an imaging station;

belt means for urging film against said capstans, said belt means contacting said film along an edge thereof;

illumination means for producing a line of light on said film as it is contacted by said capstans and said belt means, said illumination means including an integrating cylinder located between said capstans; and means for driving said capstans to advance the film relative to said illumination means, said driving means including a drive shaft which extends between said capstans.

* * * * *